(12) United States Patent
Li et al.

(10) Patent No.: US 10,900,895 B2
(45) Date of Patent: Jan. 26, 2021

(54) FAR-FIELD OPTICAL SUPER-RESOLUTION MICROSCOPY METHOD

(71) Applicant: South China University of Technology, Guangdong (CN)

(72) Inventors: Feng Li, Guangzhou (CN); Honglian Guo, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 16/496,345

(22) PCT Filed: Nov. 28, 2017

(86) PCT No.: PCT/CN2017/113369
§ 371 (c)(1),
(2) Date: Sep. 20, 2019

(87) PCT Pub. No.: WO2018/171243
PCT Pub. Date: Sep. 27, 2018

(65) Prior Publication Data
US 2020/0025682 A1   Jan. 23, 2020

(30) Foreign Application Priority Data
Mar. 22, 2017 (CN) .......................... 2017 1 0175143

(51) Int. Cl.
*G01N 21/00* (2006.01)
*G01N 21/63* (2006.01)
*G01N 29/24* (2006.01)

(52) U.S. Cl.
CPC ......... *G01N 21/63* (2013.01); *G01N 29/2418* (2013.01); *G01N 2201/06113* (2013.01); *G01N 2201/103* (2013.01)

(58) Field of Classification Search
CPC ............... G01N 21/63; G01N 29/2418; G01N 2201/06113; G01N 2201/103; G01N 21/00; G01J 3/00; G01J 3/433; G02B 21/00
See application file for complete search history.

(56) References Cited

U.S. PATENT DOCUMENTS 8,228,599 B1   7/2012   Carbon et al.
8,736,932 B1   5/2014   Guthals et al.
(Continued)

FOREIGN PATENT DOCUMENTS

CN   103245292 A   8/2013
CN   103971125 A   8/2014
(Continued)

OTHER PUBLICATIONS

ISA/CN, International Search Report dated Mar. 7, 2018 in international Application No. PCT/CN2017/113369, 4 pages with English translation.

*Primary Examiner* — Abdullahi Nur
(74) *Attorney, Agent, or Firm* — Masuvalley & Partners

(57) ABSTRACT

The present invention discloses a far-field optical super-resolution microscopy method, and particularly relates to an optical super-resolution microscopy method for micro-structures on the surface of a sample. The present invention measures the vibration modes of different micro-samples via a laser interference vibrometer, and utilizes different eigen-vibration frequencies of the micro-structures on the surface of the sample to render, under the cooperation of a sub-nanometer two-dimensional displacement scanning translation stage, a high-resolution spatial position, an excitation frequency vibration spectrum and an image pattern, thus realizing super-resolution microscopy imaging. Since the present invention utilizes the different vibration frequencies of the micro-structures on the surface of the sample to (Continued)

perform marking, and adopts a laser to excite and detect the vibration of the micro-structures, the method has the characteristics of causing no mark, no damage and no contamination to the sample.

7 Claims, 2 Drawing Sheets

(56) References Cited

U.S. PATENT DOCUMENTS

| | | |
|---|---|---|
| 2005/0280714 A1 | 12/2005 | Freeman |
| 2008/0304047 A1* | 12/2008 | Lee .................... G01J 3/433 356/51 |

FOREIGN PATENT DOCUMENTS

| | | |
|---|---|---|
| CN | 104614318 A | 5/2015 |
| CN | 105699276 A | 6/2016 |
| CN | 106296585 A | 1/2017 |
| CN | 107024457 A | 8/2017 |
| JP | 2002-286641 A | 10/2002 |
| WO | 2015/124648 A1 | 8/2015 |

* cited by examiner

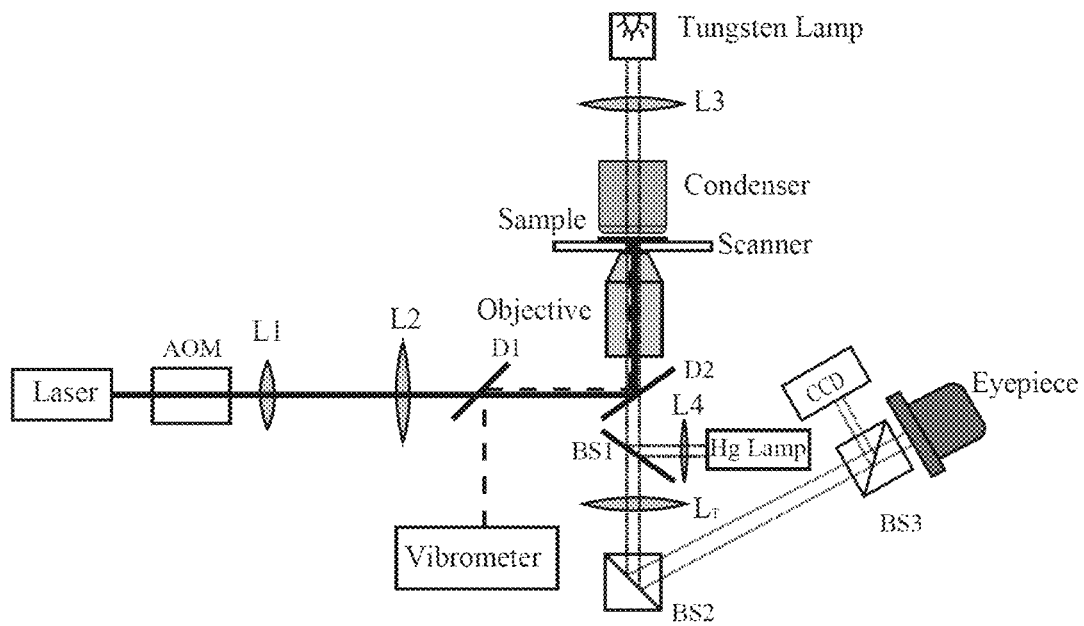
Fig. 2
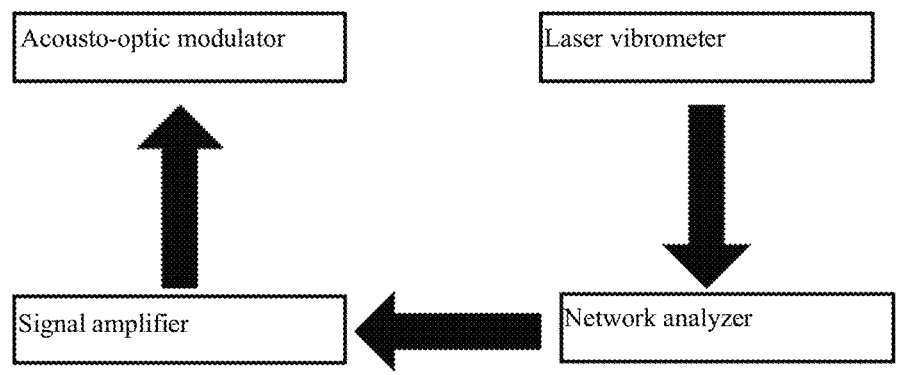
Fig. 3
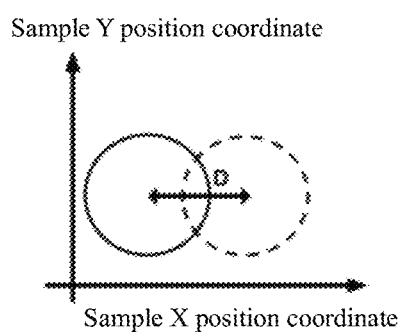 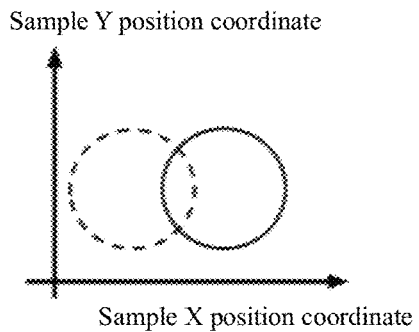
Fig. 4(a)　　　　　　　　Fig. 4(b)

FAR-FIELD OPTICAL SUPER-RESOLUTION MICROSCOPY METHOD

FIELD OF TECHNOLOGY

The present invention relates to the technical field of far-field super-resolution microscopies and expression of material performances, in particular to a far-field optical super-resolution microscopy method.

BACKGROUND

The invention of optical microscope opens a door to the mysterious micro-world for human. Hence, the human walks into another brand-new micro-world; and the resolution capability of the human for micro-samples also spans from hair thick sub-millimeter scale to sub-micron scale such as bacteria, organelles and the like. However, under the restriction of the optical diffraction limit, the resolution limit of the optical microscope also stagnates at the sub-micron scale; in order to understand finer structures, people tries various methods to circumvent the restriction of the diffraction limit, for example, the creation of the near-field scanning optical microscope.

The near-field scanning optical microscope collects an evanescent wave carrying high frequency information; the electric field intensity thereof exponentially decreases with the increase of transmission distance. If a probe a few nanometers away from the surface of a sample is used to acquire and detect a near-field optical signal, then the resolution of the optical microscope can be greatly improved, and the resolution thereof would be better than 25 nm.

Another method for improving the resolution is the far-field optical microscope based super-resolution imaging technology, mainly comprising two implementation approaches: one is a super-resolution imaging method on the basis of an illumination optical field with a special intensity distribution (for example, STED); and the other one is a uni-molecule based imaging and positioning method (for example, PALM).

The stimulated emission depletion microscopy (STED) technology is derived from the stimulated radiation theory of Einstein. German scientists Stefan W. Hell et al. proposed the STED microscope theory in 1994, creatively used the stimulated radiation to inhibit spontaneous fluorescence radiation, and finally realized the STED technology with the resolution as high as 35 nm. A typical STED microscope requires two strictly coaxial lasers, wherein one is excitation light, and the other is lossy light. The excitation light is utilized to excite fluorescent molecules in the range of an Airy spot, enabling the electrons thereof to transit from a ground state to an excited state. Subsequently, the doughnut type lossy light is used to irradiate the sample, enabling the excited molecules on the periphery of an excitation light spot to release energy and return to the ground state in a stimulated radiation manner, and enabling the excited molecules in the excitation light spot to continuously return to the ground state in a spontaneous fluorescence manner without being influenced by the lossy light. Such a combination of illumination modes restricts a fluorescence emission area in a region less than the Airy spot, and obtains a fluorescence luminous point less than the diffraction limit. Finally, a two-dimensional (or three-dimensional) super-resolution image is obtained by scanning the coaxial excitation light and lossy light in two-dimensional (or three-dimensional) space.

The photoactivation localization microscopy (PALM) technology is another far-field imaging based super-resolution technology. Abbe limit points out that an image of two fluorescent protein molecules with the distance $\lambda/2$ NA (numerical aperture) cannot be resolved at a far field, but does not restrict the central position determination precision of a single fluorescent molecule. If only one protein molecule emits fluorescence in an Airy spot, then a single molecule positioning algorithm can be utilized, in connection with the shape of the Airy spot of an optical system, to obtain the central position of the fluorescent protein molecule at a super-high precision (nano-scale). The key of applying the single molecule positioning concept to super-resolution imaging is how to differentiate a plurality of fluorescent protein molecules in an Airy spot. In order to overcome the restriction that only one protein molecule is allowed to emit fluorescence in an Airy spot, in 1995, Eric Betzig, an American scientist, proposed through theoretical analysis that light spectrum characteristics can be utilized to detect from time to time the fluorescent protein molecules with different emission wavelengths in an Airy spot and determine the central position thereof, so as to realize the super-resolution imaging of a fluorescence densely marked sample. In 2006, Eric Betzig et al. realize biological sample super-resolution imaging by utilizing the controllable fluorescent switch characteristic of photoactivation fluorescent protein (PA-FP) in connection with the single molecule positioning algorithm. Eric Betzig et al. utilize a low energy 405 nm pulsed laser (activated light) to activate PA-FP, and utilize a 561 nm continuous laser (excitation light) to perform single molecule fluorescence imaging on the activated PA-FP, until the activated PA-FP molecule is photobleached. Repeating the activation-measurement-bleaching process can find the central positions of a large number of PA-FP molecules in an Airy spot at a high precision, such that a super-resolution image formed by the central positions of the PA-FP molecules can be re-constructed.

In 2006, Zhuang Xiaowei team at Harvard University proposed the stochastic optical reconstruction microscopy (STORM); the imaging principle thereof, similar to that of PALM, is to utilize light to convert and accurately position a fluorescent molecule switch, and then re-constructs a fluorescent image. Supposing that a hexamer is marked with a red fluorescent group, fluorescence and dark state of the fluorescent group can be converted under red and green pulsed lasers. All the fluorescent groups can be converted into dark state by an intense red pulsed laser. In each imaging cycle, the green pulsed laser only irradiates a part of the fluorescent group, such that active fluorescent groups can be identified. Next, under the illumination of red light, the molecules emit fluorescence all the time before turned off, such that the positions thereof can be accurately determined. The entire image can be re-constructed after a plurality of imaging cycles.

The technologies introduced above, no matter the near-field scanning optical microscope technology or the far-field imaging based super-resolution technologies, realize a resolution breaking through the diffraction limit. However, for the near-field scanning optical microscope technology, the probe is very expensive and the service life is extremely short, which would necessarily restrict the wide use thereof. The far-field imaging based super-resolution technologies, such as STED, PALM and STORM, all perform imaging on the basis of fluorescent molecules. However, marking fluorescent molecules is toxic and harmful to a biological sample. In addition, the marking doubtlessly proposes a higher requirement for the preparation of the sample. Therefore, the present invention proposes to utilize different frequency domain features of micro-samples to mark the specific positions of different samples by combining frequency domain and space scanning, thus realizing displacement super-resolution.

SUMMARY

The object of the present invention is to solve the above-described defects in the prior art and provide a far-field optical super-resolution microscopy method. The method utilizes different frequency domain features of micro-samples to mark the specific positions of different samples by combining frequency domain and space scanning, thus realizing displacement super-resolution.

The object of the present invention can be achieved by adopting the following technical solution:

A far-field optical super-resolution microscopy method, the method comprising the following steps:

S1, placing a sample on a displacement scanning translation stage, and finding, via a microscopy imaging system, an area in which a sample to be measured is located, wherein a transmission imaging system is adopted to image a comparatively transparent sample, and a reflection imaging system is adopted to image a non-transparent sample;

S2, inputting, via a signal amplifier, a signal of a network analyzer with the frequency f into an acousto-optic modulator to modulate the intensity of an excitation laser, wherein the intensity of the excitation laser changes at the same frequency;

S3, enabling the excitation laser to pass through a first lens L1 and a second lens L2, and focusing the excitation laser by an objective on the sample as an excitation light source for vibrating the sample;

S4, measuring at a far field a resonance frequency, an amplitude and a phase of a micro-structure on the surface of the sample via a laser interference vibrometer;

S5, performing nano-precision point-by-point scanning on the surface of the sample to be measured by the displacement scanning translation stage, and for each scanned point, obtaining a vibration frequency response of the micro-structure at the position via the network analyzer, wherein the vibration frequency response comprises an amplitude characteristic and a phase characteristic; and S6, rendering a high-resolution spatial position, an excitation frequency vibration spectrum, and an image pattern by the displacement scanning translation stage.

Further, the transmission imaging system comprises a tungsten lamp, a third lens L3, a condenser, an objective, an auxiliary imaging lens, a charge-coupled device or an eyepiece.

Further, the reflection imaging system comprises an Hg lamp, a fourth lens L4, an objective, an auxiliary imaging lens, a charge-coupled device or an eyepiece.

Further, a 632.8 nm laser emitted by the laser interference vibrometer is reflected by a first dichroic mirror D1, then is converged with an optical path of a 532 nm excitation laser, and finally irradiates on the sample through a completely coincident path; and the 632.8 nm laser reflected back from the sample returns to the laser interference vibrometer.

Further, the vibration spectrum and the image pattern are a two-dimensional pseudo-color image taking two-dimensional spatial fine grids as X and Y coordinates, and taking vibration amplitude as intensity.

Further, the displacement scanning translation stage adopts a two-dimensional sub-nano-precision piezoelectric ceramic displacement scanning translation stage.

Further, the objective adopts a high numerical aperture objective.

Compared to the prior art, the present invention has the following advantages and effects:

The present invention discloses a far-field optical super-resolution microscopy method, and particularly relates to an optical super-resolution microscopy method for micro-structures on the surface of a sample. The method measures the vibration modes of different micro-samples via a laser interference vibrometer, and utilizes different eigen-vibration frequencies of the micro-structures on the surface of the sample to render, under the cooperation of a sub-nanometer two-dimensional displacement scanning translation stage, a high-resolution spatial position, an excitation frequency vibration spectrum and an image pattern, thus realizing super-resolution microscopy imaging. The present invention utilizes the different vibration frequencies of the micro-structures on the surface of the sample to perform marking, and adopts a laser to excite and detect the vibration of the micro-structures. Therefore, the method has the characteristics of causing no mark, no damage and no contamination to the sample.

BRIEF DESCRIPTION OF THE DRAWINGS

FIG. 2 is a detection schematic diagram of the super-resolution microscopy system in the present invention;

FIG. 3 is a schematic view of vibration excitation and detection;

FIG. 4(a) is a schematic diagram of super-resolution microscopy under the excitation frequency 1; and FIG. 4(b) is a schematic diagram of super-resolution microscopy under the excitation frequency 2.

Figure 1:
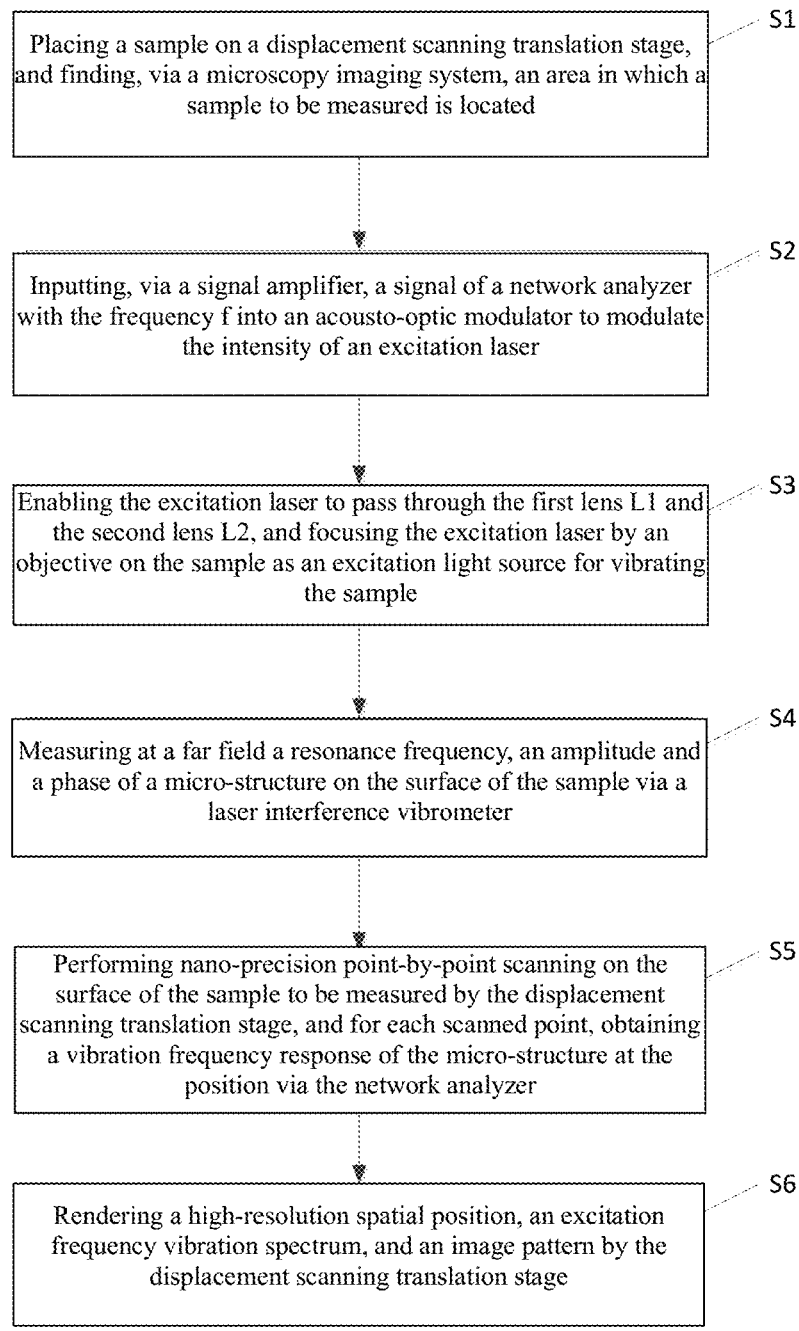
FIG. 1 is a flow chart of the far-field optical super-resolution microscopy method according to the present invention.

Wherein L1—first lens, L2—second lens, L3—third lens, L4—fourth lens, D1—first dichroic mirror, D2—second dichroic mirror, BS1—first beam splitter mirror, BS2—second beam splitter mirror, BS3—third beam splitter mirror, LT—auxiliary imaging lens, Laser—laser, AOM—acousto—optic modulator, Objective—objective, Vibrometer—laser interference vibrometer, Scanner—two—dimensional sub—nano—precision piezoelectric ceramic displacement scanning translation stage, Tungsten Lamp—tungsten lamp, Hg lamp—mercury lamp, Condenser—condenser, CCD—charge—coupled device, Eyepiece—eyepiece, Sample—sample.

DESCRIPTION OF THE EMBODIMENTS

Exemplary E

In order to enable the object, technical solution and advantages of the embodiments of the present invention to be clearer, the technical solutions in the embodiments of the present invention will be clearly and completely described hereafter in connection with the drawings in the embodiments of the present invention. It is apparent that the described embodiments are a part of the embodiments of the present invention, but not the whole. On the basis of the embodiment in the present invention, all the other embodiments obtained by a person skilled in the art without involving an inventive effort are all concluded in the protection scope of the present invention.

Embodiment

The embodiment discloses a far-field optical super-resolution microscopy method. The method measures at a far field the vibration frequencies, amplitudes and phases of the micro-structures on the surface of the sample to be measured via a laser interference vibrometer, and utilizes different eigen-vibration frequencies of the micro-structures on the surface of the sample to be measured to render, under the cooperation of a displacement scanning translation stage, a high-resolution frequency spectrum and an image pattern, thus realizing super-resolution displacement measurement. The method utilizes the individual frequency difference of the micro-structures at different positions on the surface of the sample to be measured to perform marking, and adopts a laser beam to excite and detect the eigen-frequencies thereof. Therefore, the method has the characteristics of being non-contact with the sample and causing no mark, no damage and no contamination to the sample.

As shown in FIG. 1, the far-field optical super-resolution microscopy method disclosed by the present invention specifically comprises the following steps:

S1, placing a sample on a displacement scanning translation stage, and finding, via a microscopy imaging system, an area in which a sample to be measured is located, wherein a transmission imaging system can be adopted to image a comparatively transparent sample, and a reflection imaging system can be adopted to image a non-transparent sample;

Wherein the transmission imaging system comprises a tungsten lamp, a third lens L3, a condenser, an objective, an auxiliary imaging lens (LT), a charge-coupled device (CCD) or an eyepiece.

Wherein the reflection imaging system comprises an Hg lamp, a fourth lens L4, an objective, an auxiliary imaging lens (LT), a charge-coupled device (CCD) or an eyepiece.

Wherein the displacement scanning translation stage adopts a two-dimensional sub-nano-precision piezoelectric ceramic displacement scanning translation stage.

As shown in FIG. 2 which depicts a detection schematic diagram of the super-resolution microscopy system, the laser emitted by a laser is first intensity-modulated by an acousto-optic modulator (AOM), is then beam-expanded by a first lens L1 and a second lens L2, and is finally focused on the sample by the high numerical aperture objective as excitation light for locally vibrating the surface of the sample to be measured. A 632.8 nm laser emitted by the laser interference vibrometer is first converged by the same objective, and then irradiates on the sample; after being reflected by the sample, the reflected light is collected by the same objective; and the collected reflected light returns to the laser interference vibrometer, thus realizing the detection of the vibration of local micro-structures on the surface of the sample to be measured.

S2, inputting, via a signal amplifier, a signal of a network analyzer with the frequency f into the acousto-optic modulator to modulate the intensity of a 532 nm excitation laser, wherein the intensity of the excitation laser changes at the same frequency.

The formation and connection of the measuring instruments in the embodiment are as shown in FIG. 3. The signal of the network analyzer with the frequency f is input into the acousto-optic modulator via the signal amplifier, so as to modulate the intensity of the excitation laser, wherein the intensity of the excitation laser changes at the same frequency. In addition, the laser interference vibrometer detects the vibration of the micro-structures with the frequency f on the surface; and an electrical signal is inputted into the network analyzer to acquire the amplitude and phase of the vibration.

S3, enabling the excitation laser to pass through the first lens L1 and the second lens L2, and focusing the excitation laser by an objective on the sample as an excitation light source for vibrating the sample, as shown by the solid line optical path in FIG. 2, wherein the objective adopts a high numerical aperture objective.

S4, measuring at a far field a resonance frequency, an amplitude and a phase of a micro-structure on the surface of the sample via a laser interference vibrometer.

In a specific embodiment, the 632.8 nm laser emitted by the laser interference vibrometer is reflected by a first dichroic mirror D1, then is converged with an optical path of a 532 nm laser, and finally irradiates on the sample through a completely coincident path, as shown by the solid line optical path in in FIG. 2; and the 632.8 nm laser reflected back from the sample returns to the laser interference vibrometer, such that the laser interference vibrometer can detect the vibration of the micro-structures on the surface of the sample to be measured which is caused by the excitation of the 532 nm laser.

S5, performing nano-precision point-by-point scanning on the surface of the sample to be measured by the displacement scanning translation stage, and for each scanned point, obtaining a vibration frequency response of the micro-structure at the position via the network analyzer, wherein the vibration frequency response comprises an amplitude characteristic and a phase characteristic.

S6, rendering a high-resolution spatial position, an excitation frequency vibration spectrum, and an image pattern by the displacement scanning translation stage.

The vibration spectrum and the image pattern are a two-dimensional pseudo-color image taking two-dimensional spatial fine grids as X and Y coordinates, and taking vibration amplitude as intensity. And different excitation frequency images are as shown in FIG. 4(a) and FIG. 4(b).

The schematic diagrams of super-resolution microscopy in the detailed description of the embodiments of the present invention are as shown in FIG. 4(a) and FIG. 4(b). FIG. 4(a) and FIG. 4(b) are two vibration amplitude diagrams under different excitation frequencies. In the figures, the distance between the centers of two micro-structures is D; if the distance is less than a diffraction limit, then the conventional optical microscopy method would not resolve. Under the excitation frequency 1, the structure as shown in FIG. 4(a) would resonate; and the solid line area is the area with great vibration amplitude. Similarly, under the excitation frequency 2, the solid line area in FIG. 4(b) would resonate. Therefore, the two micro-structures the distance between which is less than the diffraction limit can be resolved owing to the different resonance frequencies.

In summary, the method does not require the process of performing fluorescence marking on a sample, but utilizes different natural resonance frequencies of the micro-structures on the surface of the sample. When the laser modulated by the acousto-optic modulator is focused on one micro-structure of the sample to be measured, the change of laser intensity would cause the micro-structure to locally resonate owing to the photo-thermal effect; and the mechanical vibration is detected via another converged laser, so as to obtain the vibration amplitude and phase of the structure; the vibration response of each position is obtained by combining two-dimensional space scanning; and a super-resolution microscopy spatial image is obtained by analyzing the resonance frequencies and the geometric features of the micro-vibration structures.

The embodiments above are preferred embodiments of the present invention. However, the embodiments of the present invention are not limited by the embodiments above. And any other variations, modifications, substitutions, combinations and simplifications made without departing from the essential spirit and principle of the present invention are all equivalent substitute modes, and should be concluded in the protection scope of the present invention.

What is claimed is:

1. A far-field optical super-resolution microscopy method, the method comprising the steps of:

S1, placing a sample on a displacement scanning translation stage, and finding, via a microscopy imaging system, an area in which a sample to be measured is located, wherein a transmission imaging system is adopted to image a comparatively transparent sample, and a reflection imaging system is adopted to image a non-transparent sample;

S2, inputting, via a signal amplifier, a signal of a network analyzer with the frequency f into an acousto-optic modulator to modulate the intensity of an excitation laser, wherein the intensity of the excitation laser changes at the same frequency;

S3, after the excitation laser is beam-expanded by a first lens L1 and a second lens L2, focusing the excitation laser by an objective on the sample as an excitation light source for vibrating the sample;

S4, measuring at a far field a resonance frequency, an amplitude and a phase of a micro-structure on the surface of the sample via a laser interference vibrometer;

S5, performing nano-precision point-by-point scanning on the surface of the sample to be measured by the displacement scanning translation stage, and for each scanned point, obtaining a vibration frequency response of the micro-structure at the position via the network analyzer, wherein the vibration frequency response comprises an amplitude characteristic and a phase characteristic; and S6, rendering a high-resolution spatial position, an excitation frequency vibration spectrum, and an image pattern by the displacement scanning translation stage.

2. The far-field optical super-resolution microscopy method according to claim 1, wherein the transmission imaging system comprises a tungsten lamp, a third lens L3, a condenser, an objective, an auxiliary imaging lens, a charge-coupled device or an eyepiece.

3. The far-field optical super-resolution microscopy method according to claim 1, wherein the reflection imaging system comprises an Hg lamp, a fourth lens L4, an objective, an auxiliary imaging lens, a charge-coupled device or an eyepiece.

4. The far-field optical super-resolution microscopy method according to claim 1, wherein a 632.8 nm laser emitted by the laser interference vibrometer is reflected by a first dichroic mirror D1, then is converged with an optical path of a 532 nm excitation laser, and finally irradiates on the sample through a completely coincident path; and the 632.8 nm laser reflected back from the sample returns to the laser interference vibrometer.

5. The far-field optical super-resolution microscopy method according to claim 1, wherein the vibration spectrum and the image pattern are a two-dimensional pseudo-color image taking two-dimensional spatial fine grids as X and Y coordinates, and taking vibration amplitude as intensity.

6. The far-field optical super-resolution microscopy method according to any one of claims 1-5, wherein the displacement scanning translation stage adopts a two-dimensional sub-nano-precision piezoelectric ceramic displacement scanning translation stage.

7. The far-field optical super-resolution microscopy method according to any one of claims 1-5, wherein the objective adopts a high numerical aperture objective.

* * * * *